United States Patent
Tan et al.

(10) Patent No.: US 9,423,902 B2
(45) Date of Patent: *Aug. 23, 2016

(54) AMOLED PIXEL CIRCUIT, A DRIVING METHOD THEREOF AND A DISPLAY DEVICE

(71) Applicants: Chengdu BOE Optoelectronics Technology Co., Ltd., Chengdu, Sichuan (CN); BOE Technology Group Co., Ltd., Beijing (CN)

(72) Inventors: Wen Tan, Beijing (CN); Xiaojing Qi, Beijing (CN)

(73) Assignees: Chengdu BOE Optoelectronics Technology Co. Ltd., Chengdu, Sichuan (CN); BOE Technology Group Co. Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,248

(22) PCT Filed: Dec. 16, 2013

(86) PCT No.: PCT/CN2013/089533
§ 371 (c)(1),
(2) Date: Sep. 24, 2014

(87) PCT Pub. No.: WO2014/206036
PCT Pub. Date: Dec. 31, 2014

(65) Prior Publication Data
US 2015/0049046 A1    Feb. 19, 2015

(30) Foreign Application Priority Data

Jun. 26, 2013    (CN) .......................... 2013 1 0260217

(51) Int. Cl.
*G06F 3/041* (2006.01)
*G06F 3/044* (2006.01)
*G09G 3/32* (2016.01)

(52) U.S. Cl.
CPC .............. *G06F 3/0412* (2013.01); *G06F 3/044* (2013.01); *G06F 3/0416* (2013.01); *G09G 3/325* (2013.01); *G09G 3/3233* (2013.01); *G09G 2300/0809* (2013.01); *G09G 2300/0842* (2013.01); *G09G 2300/0861* (2013.01); *G09G 2360/148* (2013.01)

(58) Field of Classification Search
CPC . G09G 3/3233; G09G 3/3225; G09G 3/3208; G09G 2310/0248; G09G 2360/148; H01L 27/323

See application file for complete search history.

(56) References Cited

U.S. PATENT DOCUMENTS

2005/0099372 A1    5/2005  Nakamura et al.
2007/0252005 A1*  11/2007  Konicek ............... G06K 9/0004
                                                                    235/435

(Continued)

FOREIGN PATENT DOCUMENTS

CN    101017419 A    8/2007
CN    101211246 B    7/2008

(Continued)

OTHER PUBLICATIONS

First Office Action and search report issued by Chinese Patent Office for priority application CN 201310260217.1 mailed Nov. 3, 2014 with English translation.

*Primary Examiner* — Sanjiv D Patel
(74) *Attorney, Agent, or Firm* — Frommer Lawrence & Haug LLP

(57) ABSTRACT

The present invention provides an AMOLED pixel circuit, a driving method thereof and a display device which can improve the integration degree of the in cell touch circuit and the AMOLED driving circuit. The AMOLED pixel circuit comprises: a light emitting module, a touching module, a controlling module and a driving and amplifying module. The embodiments of the present invention are used for manufacturing the AMOLED display device.

13 Claims, 3 Drawing Sheets

(56) References Cited

U.S. PATENT DOCUMENTS

| | | | |
|---|---|---|---|
| 2010/0097350 A1* | 4/2010 | Choi | G06F 3/042 345/175 |
| 2010/0097354 A1* | 4/2010 | Ahn | G06F 3/042 345/175 |
| 2010/0231548 A1 | 9/2010 | Mangione-Smith et al. | |
| 2011/0001711 A1* | 1/2011 | Choi | G06F 3/0412 345/173 |
| 2011/0122096 A1* | 5/2011 | Kim | G06F 3/0412 345/175 |
| 2011/0273397 A1* | 11/2011 | Hanari | G06F 3/0412 345/174 |
| 2012/0061556 A1* | 3/2012 | Chan | G09G 3/3233 250/214 R |
| 2013/0009550 A1* | 1/2013 | Ko | G09G 3/3233 315/151 |

FOREIGN PATENT DOCUMENTS

| | | |
|---|---|---|
| CN | 102402931 A | 4/2012 |
| CN | 103135846 A | 6/2013 |
| CN | 103295525 A | 9/2013 |
| CN | 103310734 A | 9/2013 |
| CN | 103325341 A | 9/2013 |
| CN | 103325342 A | 9/2013 |
| CN | 103345901 A | 10/2013 |
| CN | 203288218 U | 11/2013 |
| CN | 203288219 U | 11/2013 |
| CN | 203288220 U | 11/2013 |
| CN | 203288221 U | 11/2013 |
| WO | WO 2008/002043 A | 1/2008 |

* cited by examiner

AMOLED PIXEL CIRCUIT, A DRIVING METHOD THEREOF AND A DISPLAY DEVICE

This application is a 371 of PCT/CN2013/089533 filed on Dec. 16, 2013, which claims priority benefits from Chinese Patent Application Number 201310260217.1 filed Jun. 26, 2013, the disclosure of which is incorporated herein by reference.

FIELD OF THE INVENTION

The present invention relates to the field of display technology, in particular to an AMOLED pixel circuit, a driving method thereof and a display device.

BACKGROUND OF THE INVENTION

With the rapid development in display technology, display devices with touch function are getting more and more popular because of the advantages such as visualization. Based on the position of the touch panel relative to the display panel, existing display devices can generally be divided into two types, i.e. on cell touch panel and in cell touch panel. Compared to the on cell touch panel, the in cell touch panel has a thinner thickness and higher light transmittance, and therefore has a wider application range. For the current display devices, as a current light emitting device, the organic light emitting diode (OLED) is increasingly used in the field of high-performance display for the characteristics of self-illumination, fast response, wide viewing angle, and can be produced on flexible substrates. OLED display devices can be divided into PMOLED (Passive Matrix driving OLED) and AMOLED (Active Matrix driving OLED) according to the driving mode. The AMOLED display device is expected to replace LCD (Liquid Crystal Display) as the next generation of new flat panel display for the low manufacturing cost, high response speed, low power consumption, being DC driving for portable devices, large operating temperature range and so on. Therefore, AMOLED display panel with in cell touch function are more and more popular.

In the current AMOLED display panel, each OLED is driven to emit light by the driving circuit formed by a plurality of TFT (Thin Film Transistor) within the same pixel unit as the OLED locates on the array substrate, so as to implement display. The in cell touch screen panel (TSP) is also formed by manufacturing the sensor and the driving circuit for sensing a touch in each pixel unit of the array substrate using the array process. If the sensor and the driving circuit of the TSP are superimposed in the AMOLED pixel unit, then a number of TFTs used as the driving circuit for sensing touch shall be added in addition to the original TFTs forming the driving circuit for display in the pixel unit, such that a certain space of the pixel unit will be additionally occupied. The free space in the pixel unit is limited, therefore the concurrent manufacture of the in cell touch panel and the AMOLED driving circuit is greatly limited, the producing difficulty is enhanced and the product quality is reduced.

SUMMARY OF THE INVENTION

The embodiments of the present invention provide an AMOLED pixel circuit, a driving method thereof and a display device, which can improve the integration degree of the in cell touch circuit and the AMOLED driving circuit, such that the in cell touch panel circuit and the AMOLED driving circuit can be manufactured concurrently.

To achieve the above object, the embodiments of the present invention utilize the following solutions.

According to one aspect of the embodiments of the present invention, an AMOLED pixel circuit comprises: a light emitting module, a touching module, a controlling module and a driving and amplifying module;

The light emitting module is connected with the controlling module and a first voltage terminal, and is used for performing light emitting display under the control of the controlling module;

The touching module is connected with the controlling module and a first signal line, and is used for receiving an input touch signal;

The controlling module is further connected with the first signal line, a second signal line, a third signal line and a data line, and is used for controlling the light emitting module and the touching module according to input signals on the signal lines; and The driving and amplifying module is connected with the light emitting module, the touching module, the controlling module and a second voltage terminal, and is used for driving the light emitting module and amplifying the touch signals received by the touching module respectively.

The light emitting module further comprises:
a light emitting device, wherein a first terminal of the light emitting module is connected to the controlling module and a second terminal of the light emitting module is connected to the first voltage terminal.

The controlling module further comprises:
A first transistor which has a gate connected to the first signal line, and a first electrode connected to the light emitting device;
A second transistor which has a gate connected to the second signal line, a first electrode connected to a second electrode of the first transistor, and a second electrode connected to the data line;
A third transistor which has a gate connected to the third signal line, a first electrode connected to the driving and amplifying module, and a second electrode connected to the data line; and
A fourth transistor which has a gate connected to the first signal line, a first electrode connected to the second electrode of the first transistor, and a second electrode connected to the driving and amplifying module.

The driving and amplifying module further comprises:
A fifth transistor which has a gate connected to the first electrode of the third transistor, a first electrode connected to the second voltage terminal, and a second electrode connected to the first electrode of the second transistor;
A sixth transistor which has a gate connected to the first electrode of the third transistor, a first electrode connected to the second voltage terminal, and a second electrode connected to the second electrode of the fourth transistor; and
A storage capacitor which has a terminal connected to the first electrode of the third transistor, and the other terminal connected to the second voltage terminal.

The touching module comprises:
A seventh transistor which has a gate connected to the first signal line, and a first electrode connected to the first electrode of the third transistor; and
A phototransistor which has an anode connected to the second voltage terminal, and a cathode connected to a second electrode of the seventh transistor.

Alternatively, the touching module comprises:
A seventh transistor which has a gate connected to the first signal line, and a first electrode connected to the first electrode of the third transistor; and A sensing electrode connected to a second electrode of the seventh transistor.

It should be noted that, the first transistor, the second transistor, the third transistor, the fifth transistor and the sixth transistor are N-type transistors, while the fourth transistor and the seventh transistor are P-type transistors. Alternatively, the first transistor, the second transistor, the third transistor, the fifth transistor and the sixth transistor are P-type transistors, while the fourth transistor and the seventh transistor are N-type transistors.

According to another aspect of the embodiments of the present invention, a display device comprising the above AMOLED pixel circuit is provided.

According to still another aspect of the embodiments of the present invention, a driving method of the AMOLED pixel circuit comprises:

turning off the light emitting module, inputting an initialization signal to the data line, and the controlling module initializing the driving and amplifying module and the touching module according to the initialization signal;

the touching module receiving a touch signal;

turning off the touching module, and the driving and amplifying module amplifying the touch signal and outputting it to the data line;

pre-charging the driving and amplifying module under control of the controlling module by the data signal input through the data line; and turning on the light emitting module, and the driving and amplifying module driving the light emitting module to perform light-emitting display.

Specifically, the driving method comprises:

An initialization stage: the first transistor is cut off to turn off the light emitting device; the seventh transistor is turned on so as to connect the touching module to the gates of the fifth transistor and the sixth transistor; the storage capacitor is used as the storage capacitor for the fifth transistor and the sixth transistor; the second transistor, the third transistor and the fourth transistor are turned on, and the initialization signal is input through the data line to pre-charge the storage capacitor;

A touching stage: the second transistor and the third transistor are cut off, and the touching module receives a touch signal;

A reading stage: the second transistor and the fourth transistor are turned on, the first transistor and the third transistor are cut off, such that the touching module is turned off; and the fifth transistor and the sixth transistor amplify gate voltages thereof and output them to the data line;

The writing stage: the seventh transistor is cut off, the second transistor, the third transistor and the fourth transistor are turned on; and the gray scale current input through the data line charges the storage capacitor, the gates of the fifth transistor and the sixth transistor; and The light emitting stage: the second transistor, the third transistor and the fourth transistor are cut off, the first transistor is turned on, and the fifth transistor operates in the saturation region and drives the light emitting device to perform light emitting display.

The touching module receiving a touch signal comprises:

when performing a touch operation, the touching module determines to receive the touch signal based on amount of the received light of the phototransistor; or when performing a touch operation, the touching module determines to receive the touch signal based on value of the sensed capacitance formed between the sensing electrode and the user's touch terminal.

It should be noted that, the first transistor, the second transistor, the third transistor, the fifth transistor and the sixth transistor are N-type transistors, while the fourth transistor and the seventh transistor are P-type transistors; or the first transistor, the second transistor, the third transistor, the fifth transistor and the sixth transistor are P-type transistors, while the fourth transistor and the seventh transistor are N-type transistors.

In the AMOLED pixel circuit, the driving method thereof and the display device according to embodiments of the present invention, by integrating an in cell touch circuit in the AMOLED pixel circuit, the light emitting module and the touching module can utilize in common the controlling module and the driving and amplifying module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, difficulty in manufacturing the products is reduced, and the quality of the products is significantly improved.

BRIEF DESCRIPTION OF THE DRAWINGS

To more clearly explain the technical solutions in the present invention or the prior art, the drawings required to be used in description of the embodiments of the present invention or in description of the prior art will be introduced simply below. Obviously, the drawings described below are only for illustrating some embodiments of the present invention, and other drawings can be obtained according to these drawings by those having ordinary skill in the art without any creative work. In the drawings.

DETAILED DESCRIPTION OF THE EMBODIMENTS

The technical solutions of the embodiments of the present invention will be described in a clear and complete manner in conjunction with the drawings. Apparently, the described embodiments are only part of embodiments of the present invention instead of all embodiments. Based on the descried embodiments, all other embodiments obtained by those having ordinary skill in the art without creative work are intended to be encompassed by the protection scope of the present invention.

The transistors adopted in all the embodiments of the present invention can be thin film transistors or field effect transistors or other devices with the same properties. As the source and the drain of a transistor adopted herein are symmetrical to each other, the source and the drain are interchangeable. In the embodiments of the present invention, in order to distinguish between the two electrodes other than the gate of the transistor, one electrode is called a source, and the other electrode is called a drain. Furthermore, the transistors can be divided into N-type transistors or P-type transistors depending upon the characteristics thereof. In the embodiments of the present invention, when adopting the N-type transistor, a first electrode thereof is the source, and a second electrode thereof is the drain; and when adopting the P-type transistor, a first electrode thereof is the drain, and the second electrode thereof is the source.

Figure 1:
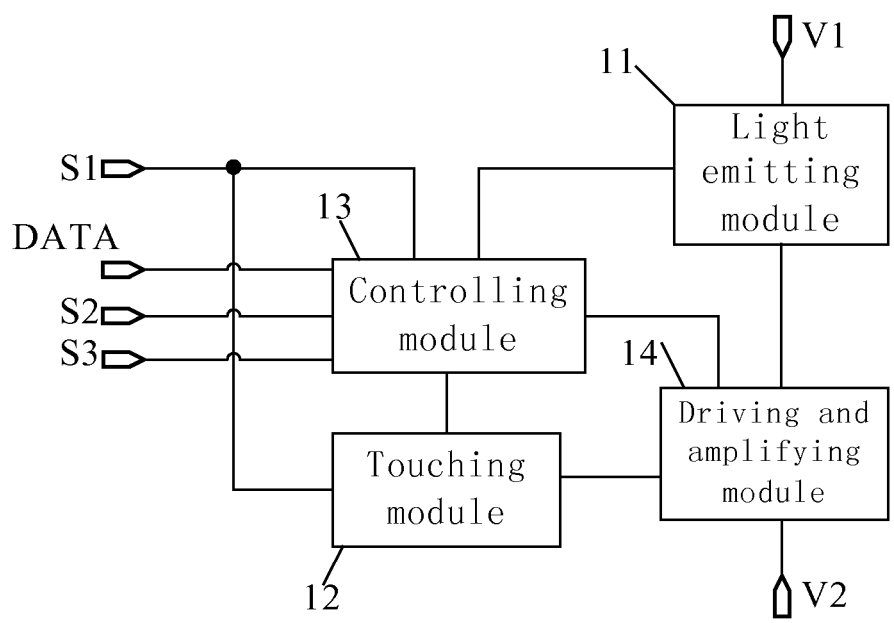
FIG. 1 is a schematic structural view of an AMOLED pixel circuit according to an embodiment of the invention.

As shown in FIG. 1, the AMOLED pixel circuit according to an embodiment of the invention comprises: a light emitting module 11, a touching module 12, a controlling module 13 and a driving and amplifying module 14.

The light emitting module 11 is connected to the controlling module 13 and a first voltage terminal V1, for performing light emitting display under the control of the controlling module 13.

The touching module 12 is connected to the controlling module 13 and a first signal line S1, for receiving an input touch signal.

The controlling module 13 is further connected to the first signal line S1, a second signal line S2, a third signal line S3 and a data line DATA, for controlling the light emitting module 11 and the touching module 12 according to input signals on the signal lines.

The driving and amplifying module 14 is connected to the light emitting module 11, the touching module 12, the controlling module 13 and a second voltage terminal V2, for driving the light emitting module 11 or amplifying the touch signal received by the touching module 12.

In the AMOLED pixel circuit according to an embodiment of the present invention, by integrating an in cell touch circuit in the AMOLED pixel circuit, the light emitting module and the touching module can utilize in common the controlling module and the driving and amplifying module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

A high level VDD can be input to the first voltage terminal V1, and a low level VSS can be input to the second voltage terminal V2. The data line DATA is shared by the light emitting module 11 and the touching module 12 in the AMOLED pixel circuit. This data line DATA is used for inputting display signals or touch signals to the AMOLED pixel circuit in different periods under control of the controlling module 13, wherein the display signal may be the light emitting control signal, and the touch signal may be the touch reading signal.

Figure 2:
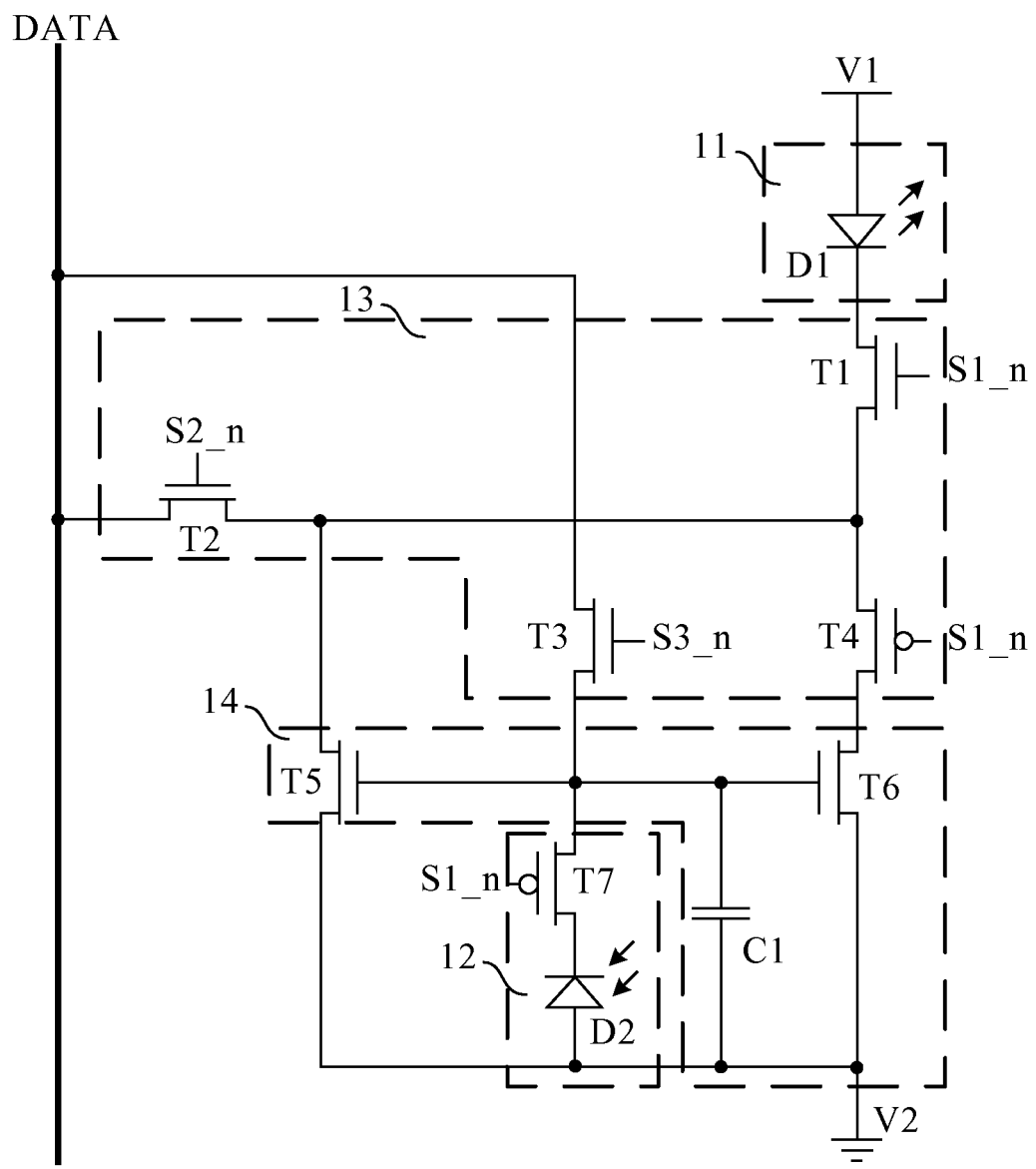
FIG. 2 is a schematic circuit diagram of an AMOLED pixel circuit according to an embodiment of the invention.

Specifically, as shown in FIG. 2, in the AMOLED pixel circuit according to an embodiment of the present invention, the light emitting module 11 may include: a light emitting device D1 which has one terminal connected to the controlling module 13, while the other terminal connected to the first voltage terminal V1.

In the embodiment of the present invention, the light emitting device D1 can be various current driving light emitting devices such as LED (Light Emitting Diode) or OLED (Organic Light Emitting Diode). In the embodiment of the present invention, OLED is taken as an example of the light emitting device D1.

Further, as shown in FIG. 2, the controlling module 13 may comprise:
A first transistor T1 which has a gate connected to the first signal line S1, and a first electrode connected to the light emitting device D1;

A second transistor T2 which has a gate connected to the second signal line S2, a first electrode connected to a second electrode of the first transistor T1, and a second electrode connected to the data line DATA;

A third transistor T3 which has a gate connected to the third signal line S3, a first electrode connected to the driving and amplifying module 14, and a second electrode connected to the data line DATA; and A fourth transistor T4 which has a gate connected to the first signal line S1, a first electrode connected to a second electrode of the first transistor T1, and a second electrode connected to the driving and amplifying module 14.

In the AMOLED pixel circuit as shown in FIG. 2, the driving and amplifying module 14 may comprise:
A fifth transistor T5 which has a gate connected to the first electrode of the third transistor T3, a first electrode connected to the second voltage terminal V2, and a second electrode connected to the first electrode of the second transistor T2;

A sixth transistor T6 which has a gate connected to the first electrode of the third transistor T3, a first electrode connected to the second voltage terminal V2, and a second electrode connected to the second electrode of the fourth transistor T4; and A storage capacitor C1 which has a terminal connected to the first electrode of the third transistor T3 and the other terminal connected to the second voltage terminal V2.

Further, as shown in FIG. 2, the touching module 12 may comprise:
A seventh transistor T7 which has a gate connected to the first signal line S1, and a first electrode connected to the first electrode of the third transistor T3; and A phototransistor D2 which has an anode connected to the second voltage terminal V2, and a cathode connected to the second electrode of the seventh transistor T7.

With such a structure of the light sensitive touching module 12, when the user performs a touch operation, amount of the light received by the phototransistor D2 will change due to the effect of shading when the user touches the panel. The phototransistor D2 will produce different leakage currents based on different amounts of received light. By measuring the differences in the leakage currents of the phototransistors D2 in different pixel regions of the display panel, the touch position can be detected accurately.

The touching module 12 in the AMOLED pixel circuit according to the embodiment of the present invention is not limited to the light sensitive touching module, and other well known structures of touch circuit may also be applied to the present invention. For example, in the AMOLED pixel circuit shown in FIG. 3, the touching module 12 may comprise:
A seventh transistor T7 which has a gate connected to the first signal line S1, and a first electrode connected to the first electrode of the third transistor T3; and A sensing electrode C2 connected to the second electrode of the seventh transistor T7.

With such a structure of the capacitive touching module 12, when the user performs a touch operation, value of the sensed capacitance formed between the user's finger or other touch means and the sensing electrode C2 will change. By measuring the position where the value of the sensed capacitance is changed, the touch position can also be detected accurately.

In the practical application, the above two structures of the touching module 12 can be selected or replaced according to actual needs.

It should be noted that, in the AMOLED pixel circuit according to the embodiment of the present invention, the first transistor T1, the second transistor T2, the third transistor T3, the fifth transistor T5 and the sixth transistor T6 may be N-type transistors, while the fourth transistor T4 and the seventh transistor T7 may be P-type transistors. Alternatively, the first transistor T1, the second transistor T2, the third transistor T3, the fifth transistor T5 and the sixth transistor T6 may be P-type transistors, while the fourth transistor T4 and the seventh transistor T7 may be N-type transistors.

In the embodiment of the present invention, it is exemplified that the first transistor T1, the second transistor T2, the third transistor T3, the fifth transistor T5 and the sixth transistor T6 are N-type transistors, and the fourth transistor T4 and the seventh transistor T7 are P-type transistors. Apparently, when the types of the transistors are changed, the same driving effect can be achieved by changing the levels of the control signals correspondingly.

With the AMOLED pixel circuit according to the embodiment of the present invention, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

An embodiment of the present invention further provides a display device including an organic light emitting display or other displays. The display device comprises any one of the above AMOLED pixel circuits. The display device may comprise a plurality of AMOLED pixel unit arrays, each AMOLED pixel unit comprises any one of the above AMOLED pixel circuits. The display device provides the same advantageous effects as the AMOLED pixel circuits provided in above embodiments of the present invention. Specifically, the display device according to the embodiments of the present invention may be a display device comprising a current driving light emitting device such as a LED or OLED display.

The display device according to the embodiments of the present invention comprises the above AMOLED pixel circuit, wherein by integrating an in cell touch circuit in the AMOLED pixel circuit, the light emitting module and the touching module can utilize in common the controlling module and the driving and amplifying module. Thus, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

A driving method of the AMOLED pixel circuit according to an embodiment of the present invention can be applied to various AMOLED pixel circuits according to the above embodiments, the method comprises the following steps:

S101, turning off the light emitting module, inputting an initialization signal to the data line, and initializing the driving and amplifying module and the touching module according to the initialization signal by the controlling module;

S102, receiving a touch signal by the touching module;

S103, turning off the touching module, amplifying the touch signal and outputting it to the data line by the driving and amplifying module;

S104, pre-charging the driving and amplifying module under the control of the controlling module by the data signal input through the data line; and S105, turning on the light emitting module, and driving the light emitting module to perform light-emitting display by the driving and amplifying module.

According to the driving method of the AMOLED pixel circuit according to the embodiment of the present invention, by integrating an in cell touch circuit in the AMOLED pixel circuit, the light emitting module and the touching module can utilize in common the controlling module and the driving and amplifying module; in other words, the controlling module and the driving and amplifying module are time division multiplexed to drive the light emitting module and the touching module. Thus, by adjusting the timing sequence of the touch signals and the display signals, the light emitting module and the touching module can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

Figure 4:
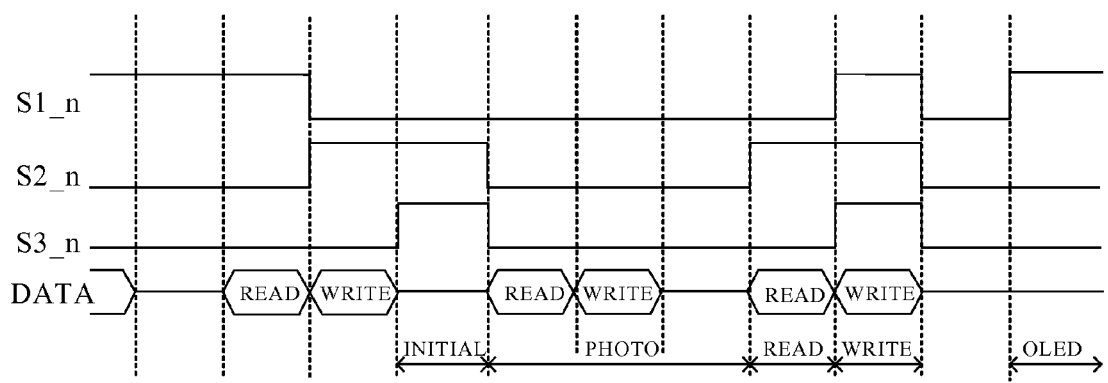
FIG. 4 is a schematic view of signal waveforms for driving the AMOLED pixel circuit shown in FIG. 2.

Hereinafter, the driving method of the AMOLED pixel circuit according to an embodiment of the present invention will be described taking the AMOLED pixel circuit shown in FIG. 2 as an example, wherein the timing waveform of the signal on each data line for driving the AMOLED pixel circuit is shown in FIG. 4. Note that, in the embodiment of the present invention, each of the gates of the first transistor T1, the fourth transistor T4 and the seventh transistor T7 is connected to the first signal line S1 and is supplied with an input signal $S1\_n$; the gate of the second transistor T2 is connected to the second signal line S2 and is supplied with an input signal $S2\_n$; the gate of the third transistor T3 is connected to the third signal line S3 and is supplied with an input signal $S3\_n$.

In the AMOLED pixel circuit shown in FIG. 2, it is exemplified that the first transistor T1, the second transistor T2, the third transistor T3, the fifth transistor T5 and the sixth transistor T6 are N-type transistors, and the fourth transistor T4 and the seventh transistor T7 are P-type transistors. Apparently, when the types of the transistors are changed, the same driving effect can be achieved by changing the levels of the control signals correspondingly.

Specifically, the driving method of the AMOLED pixel circuit according to an embodiment of the present invention comprises:

An initialization stage (INITIAL): in this stage, the signal $S1\_n$ is in low level, and the signals $S2\_n$ and $S3\_n$ are in high levels. At this time, the first transistor T1 is cut off to turn off the light emitting device D1; the seventh transistor T7 is turned on, so as to connect the touching module 12 to the gates of the fifth transistor T5 and the sixth transistor T6; the storage capacitor C1 is used as the storage capacitor for the fifth transistor T5 and the sixth transistor T6; the second transistor T2, the third transistor T3 and the fourth transistor T4 are turned on, an initialization signal is input through the data line DATA to pre-charge the storage capacitor C1.

By initializing the touching module 12, the storage capacitor C1 can be pre-charged, such that the fifth transistor T5 is ensured to be operated in the saturation amplification state in the next stage.

A touching stage (PHOTO): in this stage, the signals $S1\_n$, $S2\_n$ and $S3\_n$ are in low level; the second transistor T2 and the third transistor T3 are cut off, the seventh transistor T7 is kept turning on, and the touching module 12 receives a touch signal. The structure of the touching module 12 is shown in FIG. 2. The touching module 12 comprises a phototransistor D2. With such a structure of the light sensitive touching module 12, when the user performs a touch operation, amount of the light received by the phototransistor D2 will change due to the effect of shading when the user touches the panel. The phototransistor D2 will produce different leakage currents based on different amounts of received light. By measuring the differences in the leakage currents of the phototransistors D2 in different pixel regions of the display panel, the touch position can be detected accurately.

Figure 3:
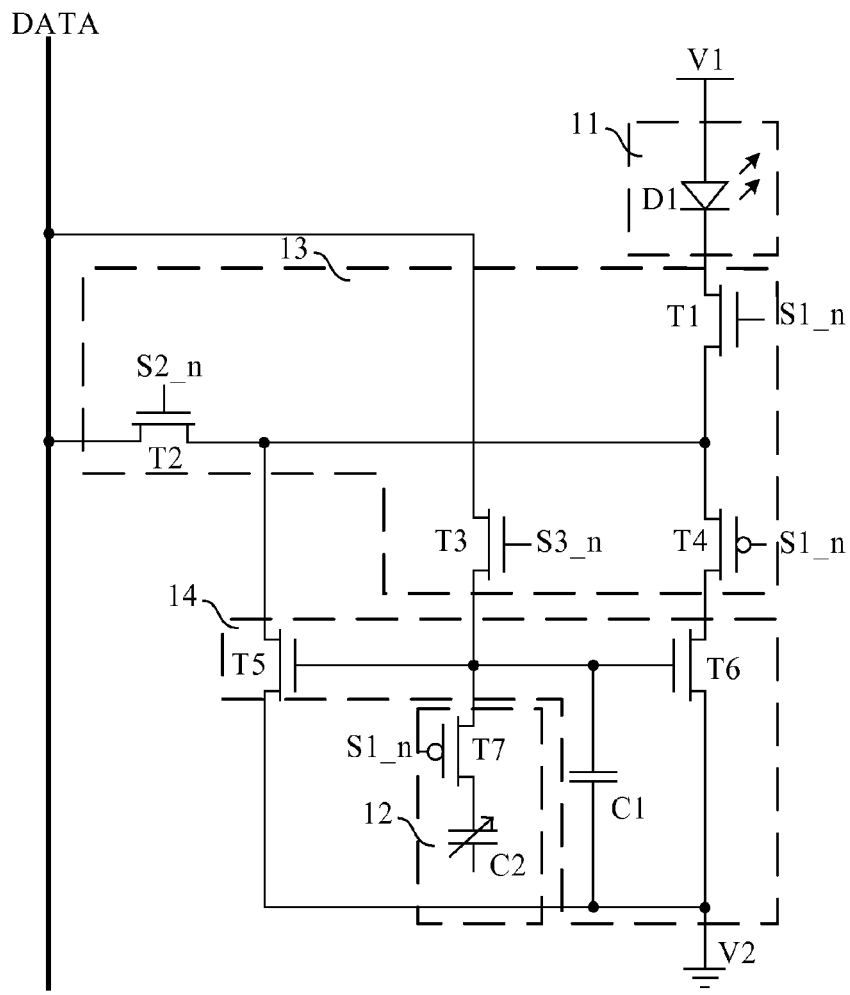
FIG. 3 is a schematic circuit diagram of another AMOLED pixel circuit according to an embodiment of the invention.

The touching module 12 in the AMOLED pixel circuit according to the embodiment of the present invention is not limited to the light sensitive touching module, and other well known structures of touch circuit may also be applied to the present invention. For example, the touching module 12 may has a structure comprising a sensing electrode C2 as shown in FIG. 3. With such a structure of the capacitive touching module 12, when the user performs a touch operation, value of the sensed capacitance formed between the user's finger or other touch means and the sensing electrode C2 will change. By measuring the position where the value of the sensed capacitance is changed, the touch position can also be detected accurately.

In the practical application, the touching module 12 including but not limited to the above two structures can be selected or replaced according to actual needs.

In the present embodiment, the touching stage will be described in detail taking the light sensitive touching module as an example. When the third transistor T3 and the fourth transistor T4 are cut off, the phototransistor D2 detects the touch state of the display panel. When the display panel is touched by a user's finger, the phototransistor D2 cannot be irradiated by an external light source and amount of the received light of the phototransistor D2 is reduced, resulting in lower light sensitive leakage current. In this stage, the voltage level on the storage capacitor C1 has less change due to the leakage current of D2. When the display panel is not touched, the external light source can irradiate onto the phototransistor D2, the phototransistor D2 receives larger light amount and produce a large light sensitive leakage current. In this stage, the voltage level on the storage capacitor C1 has larger change due to the leakage current of D2. Therefore, if the display panel is touched, the gate voltages of the fifth transistor T5 and the sixth transistor T6 (at this time the fifth transistor T5 and the sixth transistor T6 function as and amplifying transistors) have little changes from the initial voltages; and if the display panel is not touched, the gate voltages of the fifth transistor T5 and the sixth transistor T6 have large changes from the initial voltages.

A reading stage (READ): in this stage, the signals S1_n and S3_n are in low level; the signal S2_n is in high level. The second transistor T2 and the fourth transistor T4 are turned on, and the first transistor T1 and the third transistor T3 are cut off, such that the touching module 12 is turned off. The fifth transistor T5 and the sixth transistor T6 amplify the gate voltages thereof and output them to the data line DATA.

At this time, the data line DATA is used as the read line for the output voltage of the touch result. The fifth transistor T5 and the sixth transistor T6 amplify the gate voltages thereof and output them to the data line DATA, such that the touch result is output to the touch signal read circuit provided outside the display panel.

The working procedure of the touch function circuit has the above three stages, whereby implementing the touch function by detecting and reading the touch signals.

A writing stage (WRITE): in this stage, the signals S1_n, S2_n and S3_n are in high level. The seventh transistor T7 is cut off, and the second transistor T2 and the third transistor T3 are turned on. The gray scale current input through the data line DATA charges the storage capacitor C1, and the data voltage is applied to the gates of the fifth transistor T5 and the sixth transistor T6.

Since the second transistor T2 and the third transistor T3 are turned on, the gate and the drain of the fifth transistor T5 are directly connected and also the gate and the drain of the sixth transistor T6 are directly connected. The AMOLED is a current driving element, and the gray scale current $I_{DATA}$ is input to the data line DATA; after being charged by $I_{DATA}$, the fifth transistor T5 and the sixth transistor T6 are both in the saturation state. $I_{DATA}=I_{DS1}+I_{DS2}$, wherein $I_{DS1}$ is the saturation drain current of the fifth transistor T5, $I_{DS2}$ is the saturation drain current of the sixth transistor T6. $I_{DATA}$ is the pixel charging current (i.e. the gray scale current) applied by an external driving circuit, and the storage capacitor C1 is charged.

The saturation drain current of the fifth transistor T5 is $I_{DS1}=\frac{1}{2}k_1(-V)_{GS}V_{TH}^2$;

The saturation drain current of the sixth transistor T6 is $I_{DS2}=\frac{1}{2}k_2(-V)_{GS}V_{TH}^2$; Thus, $I_{DATA}=I_{DS1}+I_{DS2}=\frac{1}{2}k_1(-V)_{GS}(-V)_{TH}^2(+)\frac{1}{2}k_2(-)V_{GS}V_{TH}^2=\frac{1}{2}k_1+k_2V_{GS}V_{TH}^2$ so, $I_{DS2}/I_{DS1}=k_2/k_1$, wherein T5 and T6 are transistors with different width to length ratios, the current coefficients thereof are k1 and k2 respectively, $V_{GS}$ is the common gate-source voltages of T5 and T6;

$$k = \mu C_{ox} \frac{W}{L},$$

wherein W is the channel width, and L is the channel length.

A light emitting stage (OLED): in this stage, the signals S2_n and S3_n are in low level, the signal S1_n is in high level. At this time, the second transistor T2, the third transistor T3 and the fourth transistor T4 are cut off, the first transistor T1 is turned on, and the fifth transistor T5 operates in the saturation region and drives the light emitting device D1 to perform light emitting display.

As compared to the writing stage, the drain current of the fifth transistor T5 is $I_{DS1}'=\frac{1}{2}k_1(-V)_{GS}V_{TH}^2$ and the drain current of the sixth transistor T6 is $I_{DS2}'=0$ $I_{OLED}$ is the current flowing through the OLED, $I_{OLED}=I_{DS1}'+I_{DS2}'=\frac{1}{2}k_1(-V)_{GS}V_{TH}^2$. Thus, $$\frac{I_{DATA}}{I_{OLED}} = \frac{\frac{1}{2}k_1(V_{GS}-V_{TH})^2 + \frac{1}{2}k_2(V_{GS}-V_{TH})^2}{\frac{1}{2}k_1(V_{GS}-V_{TH})^2} = \frac{k_1+k_2}{k_1}.$$

it can be seen that $I_{OLED}$ is a current proportional to $I_{DATA}$ and $I_{DATA}$ and $I_{OLED}$ may have a larger current scaling ratio by selecting the values of k1 and k2. In the pixel circuit of the present embodiment, the pixel charging current $I_{DATA}$ and the pixel driving current $I_{OLED}$ have a large current scaling ratio of $$\frac{k_1+k_2}{k_1},$$

such that $I_{OLED}$ can keep the OLED in the range of working current, and can provide a larger pixel charging current $I_{DATA}$ so as to speed up charging of the storage capacitor C1. The light emitting device D1 can keep emitting light until the next frame.

It should be noted that, the above driving method of the AMOLED pixel circuit is only illustrated with reference to the AMOLED pixel circuit shown in FIG. 2. The driving method of the AMOLED pixel circuit according to the embodiment of the present invention may also be applied to the AMOLED pixel circuit shown in FIG. 3, and the driving procedure thereof may be referred to the above embodiment and will not be described in detail.

With the driving method of the AMOLED pixel circuit according to the embodiment of the present invention, by adjusting the timing sequence of the touch signals and the display signals, the in cell touch circuit and the AMOLED pixel circuit can be driven in a time-sharing manner without an additional touch driving circuit, such that the integration degree of the in cell touch circuit and the AMOLED driving circuit are greatly improved. Therefore the in cell touch panel circuit and the AMOLED driving circuit can be manufactured concurrently in the limited space of the pixel unit, the difficulty in manufacturing the products is reduced, and the quality of the products is significantly improved.

It can be readily understood by persons skilled in the art that: all or part of steps of the above method can be implemented by hardware related to program instructions, the program can be stored in a computer readable storage medium and said steps of the method embodiment are performed when the program is executed; the storage medium includes the medium which can store program codes, such as ROM, RAM, magnetic disk, or optical disk.

The above descriptions are only specific embodiments of the present invention, but the protection scope of the present invention is not limited thereto. Any change or substitution that is readily conceivable to those skilled in the art within the technical scope of disclosure of the present invention is intended to be encompassed by the protection scope of the present invention. The protection scope of the present invention should be defined by the protection scope of the present invention.

The invention claimed is:

1. An AMOLED pixel circuit, comprising:
    a light emitting module,
    a touching module,
    a controlling module, and
    a driving and amplifying module;
    the light emitting module is connected with the controlling module and a first voltage terminal and is used for performing light emitting display under the control of the controlling module;
    the touching module is connected with the controlling module and a first signal line and is used for receiving an input touch signal;
    the controlling module is connected with the first signal line, a second signal line, a third signal line and a data line, and is used for controlling the light emitting module and the touching module under input signals of the signal lines, wherein the controlling module includes
        a first transistor which has a gate connected to the first signal line and a first electrode connected to the light emitting device;
        a second transistor has a gate connected to the second signal line, a first electrode connected to a second electrode of the first transistor, and a second electrode connected to the data line;
        a third transistor which has a gate connected to the third signal line, a first electrode connected to the driving and amplifying module, and a second electrode connected to the data line; and
        a fourth transistor which has a gate connected to the first signal line, a first electrode connected to the second electrode of the first transistor, and a second electrode connected to the driving and amplifying module; and
    the driving and amplifying module is connected with the light emitting module, the touching module, the controlling module and a second voltage terminal, and is used for driving the light emitting module and amplifying the touch signals received by the touching module.

2. The AMOLED pixel circuit according to claim 1, wherein the light emitting module comprises:
    a light emitting device, wherein a first terminal of the light emitting device is connected to the controlling module and a second terminal of the light emitting device is connected to the first voltage terminal.

3. The AMOLED pixel circuit according to claim 1, wherein the driving and amplifying module comprises:
    a fifth transistor which has a gate connected to the first electrode of the third transistor, a first electrode connected to the second voltage terminal, and a second electrode connected to the first electrode of the second transistor;
    a sixth transistor which has a gate connected to the first electrode of the third transistor, a first electrode connected to the second voltage terminal, and a second electrode connected to the second electrode of the fourth transistor; and
    a storage capacitor which has a terminal connected to the first electrode of the third transistor, and the other terminal connected to the second voltage terminal.

4. The AMOLED pixel circuit according to claim 3, wherein the touching module comprises:
    a seventh transistor which has a gate connected to the first signal line, and a first electrode connected to the first electrode of the third transistor; and
    a phototransistor which has an anode connected to the second voltage terminal, and a cathode connected to a second electrode of the seventh transistor.

5. The AMOLED pixel circuit according to claim 3, wherein the touching module comprises:
    a seventh transistor which has a gate connected to the first signal line, and a first electrode connected to the first electrode of the third transistor; and
    a sensing electrode connected to a second electrode of the seventh transistor.

6. The AMOLED pixel circuit according to claim 4, wherein,
    the first transistor, the second transistor, the third transistor, the fifth transistor and the sixth transistor are N-type transistors, while the fourth transistor and the seventh transistor are P-type transistors; or
    the first transistor, the second transistor, the third transistor, the fifth transistor and the sixth transistor are P-type transistors, while the fourth transistor and the seventh transistor are N-type transistors.

7. A display device comprising the AMOLED pixel circuit according to claim 1.

8. A driving method of an AMOLED pixel circuit, said driving method sequentially comprising the steps of:
 an initialization step of turning off a light emitting module, inputting an initialization signal to a data line, and initializing a driving and amplifying module and a touching module according to the initialization signal using a controlling module;
 a touching step of receiving a touch signal using a touching module;
 a reading step of turning off the touching module, and amplifying the touch signal and outputting the amplified touch signal to the data line using the driving and amplifying module;
 a writing step of pre-charging the driving and amplifying module under control of the controlling module by a data signal input through the data line; and
 a light emitting step of turning on a light emitting module, and driving the light emitting module to perform light-emitting display using the driving and amplifying module.

9. The driving method according to claim 8, wherein further comprising the steps of:
 in the initialization step: the first transistor is cut off to turn off the light emitting device; a seventh transistor of the touching module is turned on so as to connect the touching module to the gates of a fifth transistor and a sixth transistor of the driving and amplifying module; a storage capacitor is used for the fifth transistor and the sixth transistor; the second transistor, the third transistor and the fourth transistor are turned on, and the initialization signal is input through the data line to pre-charge the storage capacitor;
 in the touching step: the second transistor and the third transistor are cut off, and the touching module receives a touch signal;
 in the reading step: the second transistor and the fourth transistor are turned on, and the first transistor and the third transistor are cut off, such that the touching module is turned off; and the fifth transistor and the sixth transistor amplify gate voltages thereof and output them to the data line;
 in the writing step: the seventh transistor is cut off, the second transistor, the third transistor and the fourth transistor are turned on; and a gray scale current input through the data line charges the storage capacitor, the gates of the fifth transistor and the sixth transistor; and
 in the light emitting step: the second transistor, the third transistor and the fourth transistor are cut off, the first transistor is turned on, and the fifth transistor operates in a saturation region and drives the light emitting device to perform light emitting display.

10. The driving method according to claim 8, wherein the touching module receiving a touch signal comprises:
 when performing a touch operation, the touching module determines to receive the touch signal based on amount of the received light of the phototransistor; or
 when performing a touch operation, the touching module determines to receive the touch signal based on value of the sensed capacitance formed between the sensing electrode and the user's touch terminal.

11. The driving method according to claim 9, wherein the first transistor, the second transistor, the third transistor, the fourth transistor and the fifth transistor are N-type transistors, while the sixth transistor and the seventh transistor are P-type transistors; or
 the first transistor, the second transistor, the third transistor, the fourth transistor and the fifth transistor are P-type transistors, while the sixth transistor and the seventh transistor are N-type transistors.

12. The AMOLED pixel circuit according to claim 5 wherein,
 the first transistor, the second transistor, the third transistor, the fifth transistor and the sixth transistor are N-type transistors, while the fourth transistor and the seventh transistor are P-type transistors; or
 the first transistor, the second transistor, the third transistor, the fifth transistor and the sixth transistor are P-type transistors, while the fourth transistor and the seventh transistor are N-type transistors.

13. The driving method according to claim 9, wherein the touching module receiving a touch signal comprises:
 when performing a touch operation, the touching module determines to receive the touch signal based on amount of the received light of the phototransistor; or
 when performing a touch operation, the touching module determines to receive the touch signal based on value of the sensed capacitance formed between the sensing electrode and the user's touch terminal.

* * * * *